(12) United States Patent
Bloomquist et al.

(10) Patent No.: US 6,480,813 B1
(45) Date of Patent: Nov. 12, 2002

(54) METHOD AND APPARATUS FOR DEFINING A PRECISION DRAWING IN A DRAWING PROGRAM

(75) Inventors: Brett K. Bloomquist, Santa Rosa; Alexander Thoemmes, San Rafael, both of CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/256,661

(22) Filed: Feb. 24, 1999

(51) Int. Cl.⁷ .......................... G06F 17/50; G06T 11/20
(52) U.S. Cl. .......................... 703/1; 345/662; 345/862
(58) Field of Search .......................... 703/1; 345/140, 345/133, 141-3, 113, 114, 118, 146, 157, 862, 469, 662, 856, 860, 421

(56) References Cited

U.S. PATENT DOCUMENTS

| | | | |
|---|---|---|---|
| 5,123,087 A | * 6/1992 | Newell et al. | ............... 345/862 |
| 5,371,845 A | * 12/1994 | Newell et al. | ............... 345/808 |
| 5,490,241 A | 2/1996 | Mallgren et al. | |
| 5,513,309 A | 4/1996 | Meier et al. | |
| 5,572,639 A | 11/1996 | Gantt | |
| 5,581,670 A | * 12/1996 | Bier et al. | ............... 345/856 |
| 5,617,114 A | * 4/1997 | Bier et al. | ............... 345/634 |
| 5,704,028 A | * 12/1997 | Schanel et al. | ............. 395/140 |
| 5,793,377 A | 8/1998 | Moore | |
| 5,798,752 A | * 8/1998 | Buxton et al. | ............... 345/146 |

* cited by examiner

Primary Examiner—Russell Frejd
(74) Attorney, Agent, or Firm—Gates & Cooper LLP

(57) ABSTRACT

A method, apparatus, article of manufacture for defining a precision drawing point is disclosed. The method permits the definition of temporary interesting points anywhere in the drawing space. Each temporary interesting point allows the definition of a set of candidate alignment lines, all intersecting at the temporary interesting point. When the user moves a cursor within a snap distance of one of the set of candidate alignment lines, an alignment line is displayed. The precision drawing point is then defined on the alignment line. The drawing point can be defined when the cursor is within a snap distance of one of a set of pre-settable snap distances from the temporary interesting point. Alternatively, the drawing point can be defined by selecting a second temporary interesting point associated with a second set of candidate alignment lines, and positioning the cursor within a snap distance of one of the second set of candidate alignment lines. The drawing point is then defined as the point in the drawing space where the first and second alignment lines intersect.

27 Claims, 8 Drawing Sheets

METHOD AND APPARATUS FOR DEFINING A PRECISION DRAWING IN A DRAWING PROGRAM

CROSS-REFERENCE TO RELATED APPLICATIONS

This application is related to the following co-pending and commonly assigned patent applications, all of which applications are incorporated by reference herein:

Application Ser. No. 09/256,896, entitled "ACQUIRING AND UNACQUIRING ALIGNMENT AND EXTENSION POINTS," filed on Feb. 24, 1999, by Alexander Thoemmes and Brett K. Bloomquist and Application Ser. No. 09/256,664, entitled "RELATIVE POLAR ANGLE SNAP TOOL," field Feb. 24, 1999, now U.S. Pat. No. 6,346,943 by Alexander Thoemmes and Brett K. Bloomquist.

BACKGROUND OF THE INVENTION

1. Field of the Invention

The present invention relates to computer-implemented systems and methods for drawing images, and in particular to a computer-aided drafting tool for defining a precision drawing point based on one or more temporary points.

2. Description of the Related Art

Computer aided design (CAD) and other drawing programs allow the preparation and editing of machine drawings, schematic drawings, and artwork. Typically, the user creates these drawings with the use of a library of objects and a number of drawing tools. These drawing tools allow the user to define and edit lines, polygons, ovoids, and other shapes.

One useful feature in such drawing programs is the ability to draw new objects and to define new precision points using alignment lines based upon geometric relationships with existing objects or portions of existing objects. To accomplish this, the user first selects an interesting point on an existing object such as the end point of a line. The selection of the interesting point allows the definition of a set of magnetic alignment lines, each of which is displayed as the user moves the cursor within a snap distance of each candidate alignment line. The user can then select the precision point along the alignment line. "Magnetic alignment lines" are lines in a drawing that can be defined from one or more points identified in the drawing. These lines are used to assist the user in defining other lines and objects, but are not part of the drawing itself. Typically, the magnetic alignment lines are not displayed until a cursor approaches within a snap distance of the line. Once that occurs, the magnetic alignment line, which may optionally include a superimposed secondary cursor, appears.

Although the above-described systems allow the user to use interesting points to define alignment lines, they are limited in that they require that the user-selected interesting points be somehow associated with some existing object or geometry like the end point of a line or the center point of a circle. This can require the user to define one or more objects or shapes solely for the purpose of obtaining precision alignment lines to define a precision point. Not only is this a waste of user effort and time, but the user has to remember to delete the objects, or they will remain in the drawing. What is needed is a method for defining a precision drawing point using user-defined temporary interesting points that can be anywhere in the drawing space and unassociated with any existing objects. The present invention satisfies that need.

SUMMARY OF THE INVENTION

To address the requirements described above, the present invention discloses a method, apparatus, and article of manufacture for defining a precision drawing point in a drawing space.

The method comprises the steps of accepting a command to specify a temporary interesting point anywhere in a drawing space on a display, and displaying an alignment line when a command is accepted to move a cursor to within a snap distance of one of a set of pre-settable alignment lines extending from the temporary interesting point.

In one embodiment of the present invention, an indicator is displayed to indicate the position of the user-selected temporary interesting points. Candidate positions for the precision point can be defined and annotated as the intersection of alignment lines from two user-defined temporary interesting points, or can be defined and annotated when the cursor is moved within a length snap distance from one of a set of pre-settable distances from the temporary interesting point and extending along the displayed alignment line. The article of manufacture comprises a program storage device tangibly embodying instructions for performing the method steps described above.

The apparatus comprises means for accepting a command specifying a temporary interesting point anywhere in the drawing space, and means for displaying an alignment line when a command is accepted to move the cursor to within a snap distance of one of a set of pre-settable lines extending from the temporary interesting point.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
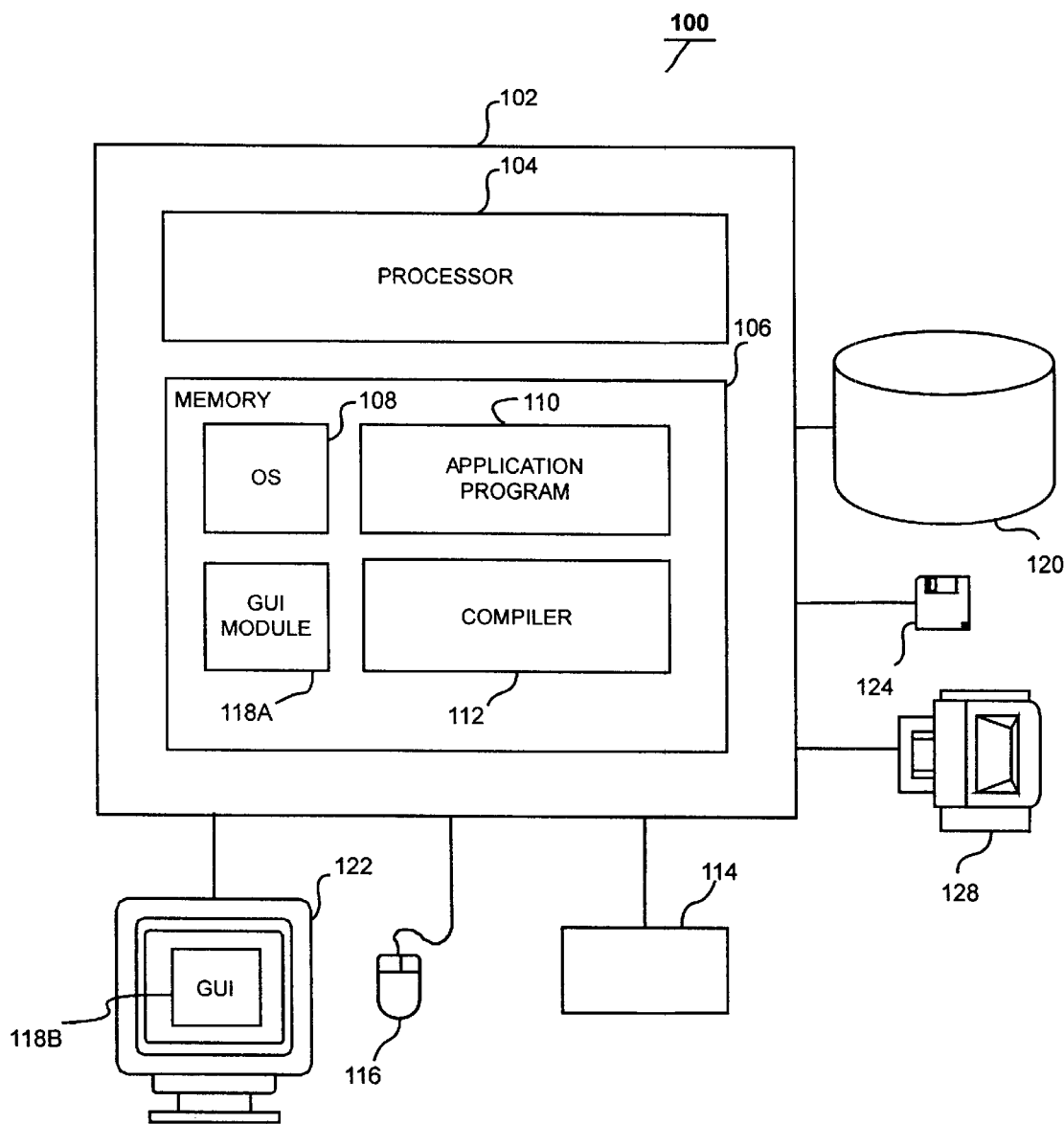
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the processor 104, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
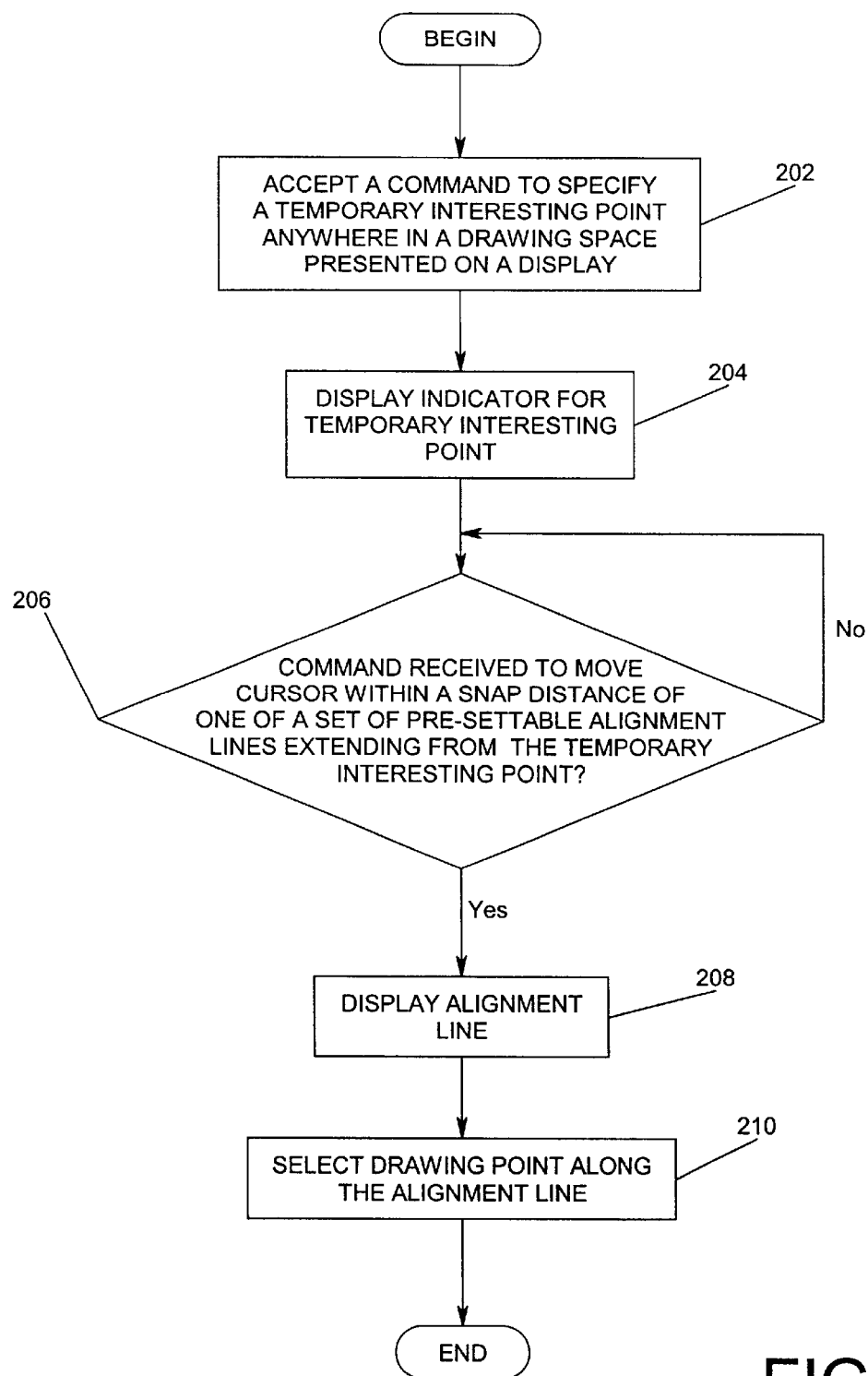
FIG. 2 is a flow chart presenting an illustrative example of process steps used in defining a precision drawing point.

FIG. 2 is a flow chart showing the an exemplary embodiment of the operations used to define a precision drawing point. First, a command is accepted to specify a temporary interesting point in a drawing space, as shown in block 202. The temporary interesting point is then stored and used to automatically perform precision distance and angular alignments. The temporary interesting point can be defined anywhere in the drawing space 300, and in one embodiment, it need not be associated with any existing geometry in the drawing space.

Figure 3:
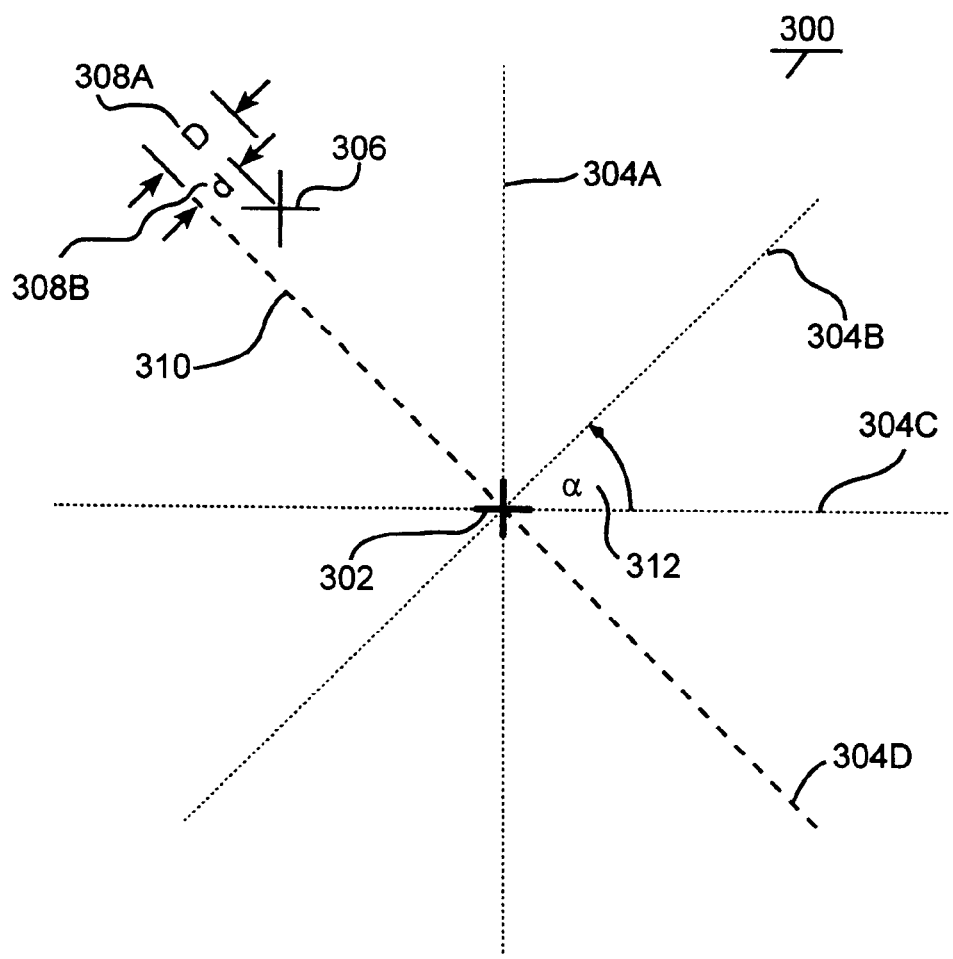
FIG. 3 is a diagram presenting an illustrative example of an application of the process steps described in FIG. 2.

FIG. 3 is a diagram providing an exemplary illustration of the application of the process steps described in FIG. 2. The operation described in block 202 can be accomplished by manipulating the mouse 116 or similar input device such as a trackball or touchpad to move a cursor 306 across a drawing space 300 presented on the display 122 until the cursor 306 is positioned at the desired location, then selecting one of the mouse buttons to specify the temporary interesting point. Alternatively, keyboard 114 buttons can be used for selecting objects and moving the cursor, using arrow keys.

The specification of the temporary interesting point defines the intersection of a set of candidate alignment lines 304A–304D (collectively referred to hereinafter as 304). Although they are depicted in FIG. 3 for purposes of illustration, the candidate alignment lines 304 would ordinarily be invisible to the user until the cursor 306 is moved within a snap distance of one of the candidate alignment lines 304, as described below.

In one embodiment, the angular distance $\alpha$ 312 between each alignment line is pre-settable. In another embodiment, when the user invokes a command to define a temporary interesting point, a dialog box is presented, asking the user to enter the angular distance between alignment lines. In the illustrated embodiment, the angular distance $\alpha$ 312 between each alignment line is constant. However, the present invention may be implemented by defining candidate alignment lines that are not a constant angular distance $\alpha$ 312 apart. In some applications, it may be desirable to define a set of candidate alignment lines in which there is a finer resolution (smaller angular distance $\alpha$ 312 between lines) in regions where the user is likely to demand finer resolution, and coarser resolution where finer resolution is not required. For example, the invention may be implemented where there is coarser resolution (greater angular distance between alignment lines 304) for those lines near 90 degrees (such as alignment lines 304A and 304C), and finer resolution near lines of 45 degrees (such as alignment lines 304B and 304D). This implementation presumes that in certain regions the user is likely to want to define a precision point at a commonly used angle (such as 90 degrees), but that in other regions, the user is likely to want to define a precision point at a less-commonly used angle. The foregoing functionality can also be implemented by using different snap distances for each of the candidate alignment lines as well.

As shown in block 204 of FIG. 2, once the temporary point has been defined, a glyph or other indicator 302 may be displayed at the location of the temporary interesting point on the drawing space 300.

Next, block 206 determines if a command was received to move the cursor 306 within a snap distance D 308A of one of the alignment lines 304. When the cursor 306 is moved within a snap distance D 308A of one of the set of candidate alignment lines 304 (to distance d 308B, for example), an alignment line 310 is displayed in the drawing space, as shown in block 208. The alignment line 310 provides the user with a frame of reference for selecting a precision drawing point based upon a geometric relationship with the temporary interesting point. The user can then select one or more drawing points along the alignment line 310, as shown in block 210.

Figure 4:
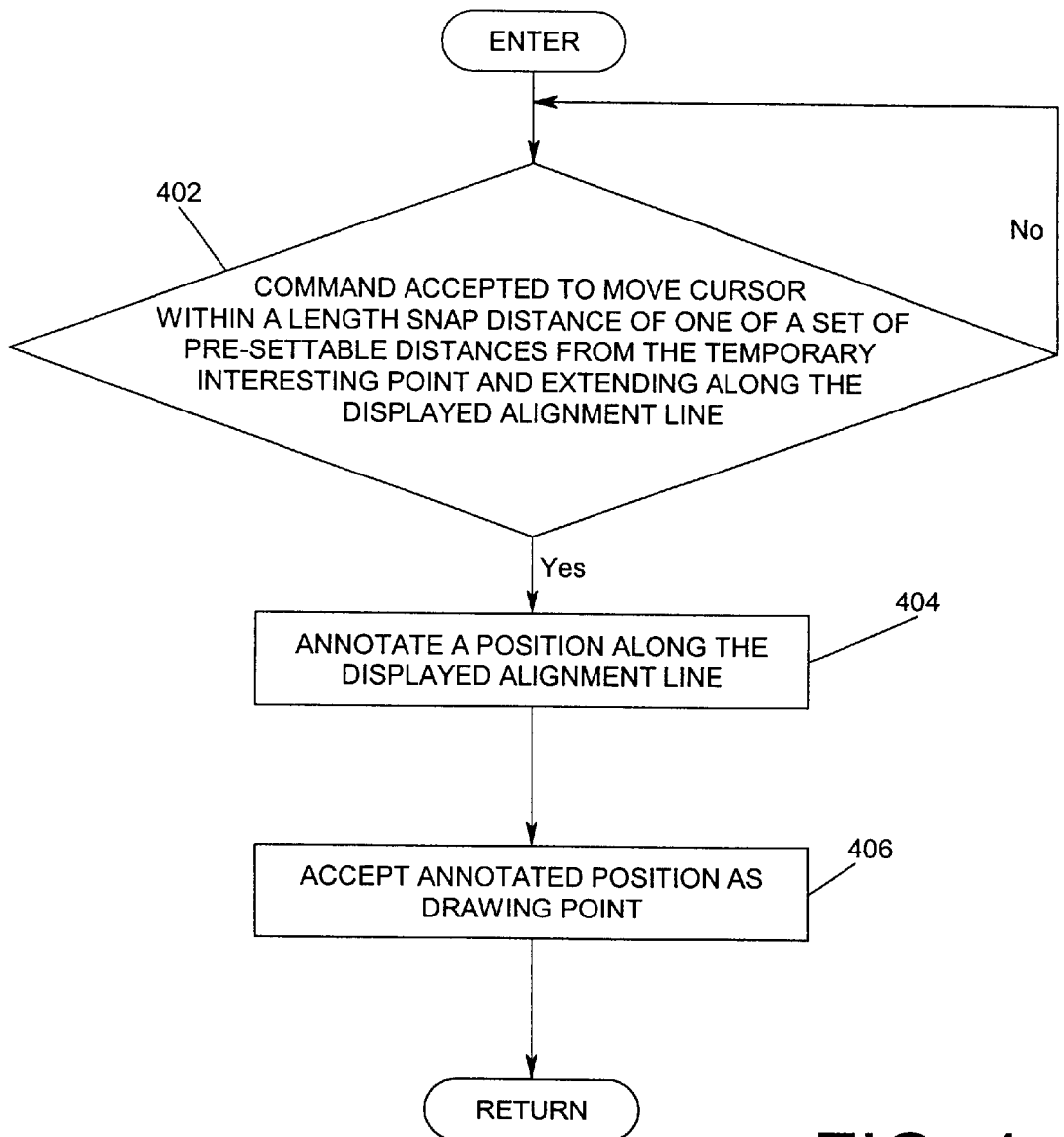
FIG. 4 is a flow chart presenting an illustrative example of process steps used to select a drawing point along an alignment line.

FIG. 4 is a block diagram illustrating exemplary process steps used to select the drawing point on the alignment line 310. In this embodiment, the drawing point is determined by snapping to one of a set of pre-settable distances from the temporary interesting point. First, as shown in block 402, a command is accepted to move the cursor 306 within a length snap distance D2 502A from one of a set of distance points 504 from the temporary interesting point extending along the displayed alignment line 310. When this occurs, a position is annotated along the displayed alignment line, as shown in block 404.

Figure 5:
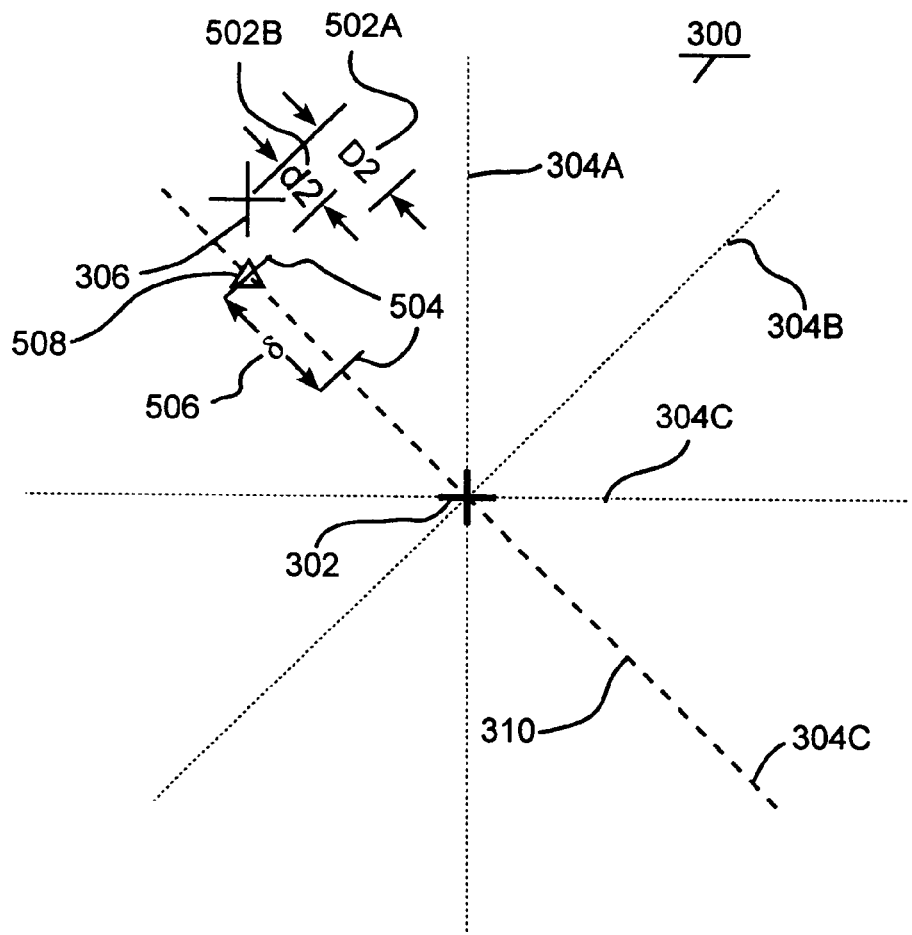
FIG. 5 is a diagram presenting an illustrative example of an application of the process steps described in FIG. 4.

FIG. 5 is a diagram providing an exemplary illustration of the application of the process steps described in FIG. 4. In the example illustrated in FIG. 5, the distance d2 502B from the cursor 306 to one of the distance points 504 is less than the snap distance D2 502A. Hence, using a glyph or other indication 508 of the position is annotated along the displayed alignment line. Thereafter, the user can select the annotated position as the drawing point by an appropriate selection of one of the mouse 116 buttons or the keyboard 114 keys, as shown in block 404.

The distance 506 between each of the distance points 504 can be pre-settable to a fixed value, or user-selectable via the dialog box described above. In the embodiment illustrated in FIG. 5, the distance 506 between the distance points 504 is constant, but this need not be the case. For example, the distance 506 between distance points 504 may provide finer resolution near the temporary point, if desired.

Figure 6:
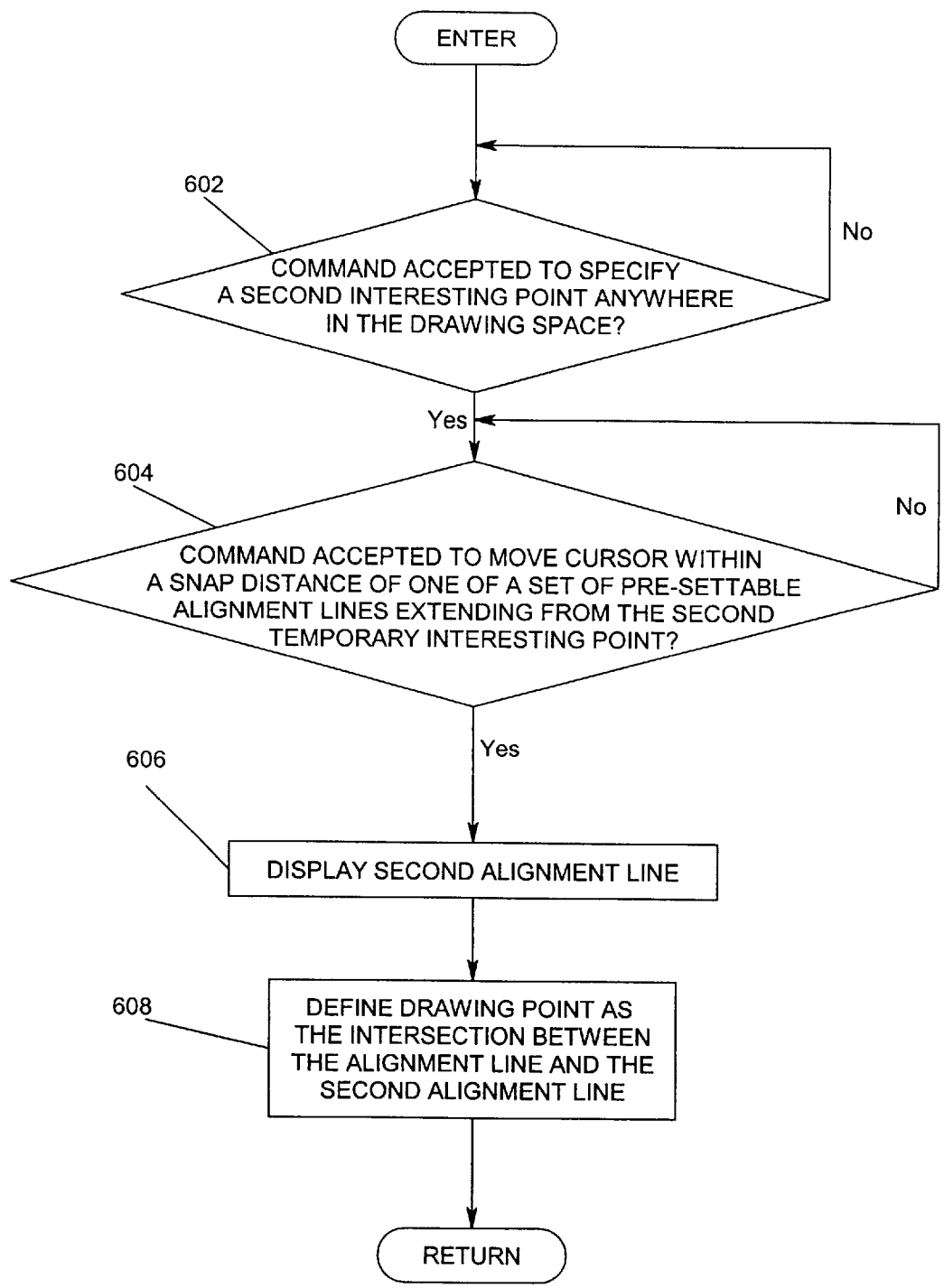
FIG. 6 is a flow chart presenting an illustrative example of process steps used to select a drawing point as the intersection of two alignment lines.

FIG. 6 is a flow chart illustrating another embodiment of exemplary process steps used to select the drawing point on the alignment line 310. Block 602 checks to see if a command to specify a second interesting point anywhere in the drawing space has been accepted.

Figure 7:
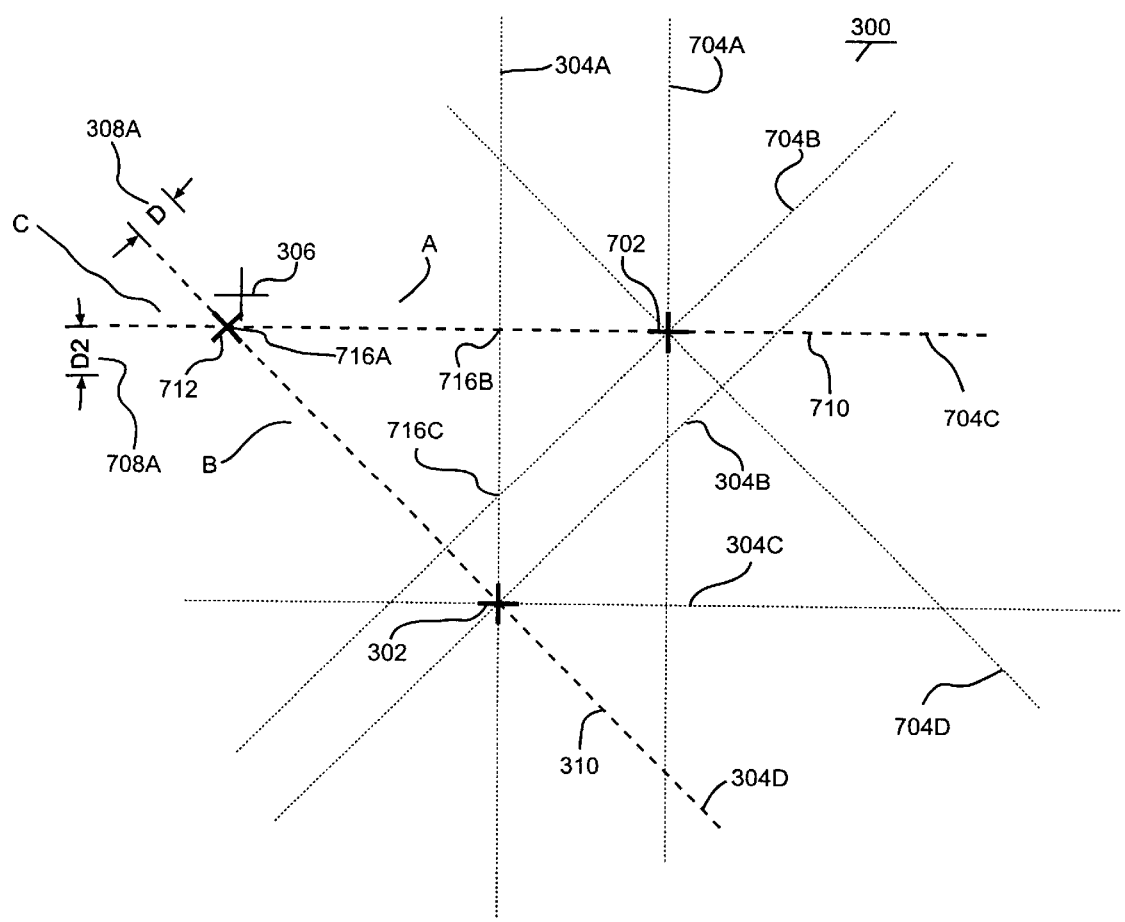
FIG. 7 is a diagram presenting an illustrative example of an application of the process steps described in FIG. 6.

FIG. 7 is a diagram providing an exemplary illustration of the application of the process steps described in FIG. 6. Once the second temporary interesting point has been selected, a second set of candidate alignment lines 704A–704D (collectively referred to hereinafter as 704) can be defined, using the techniques described above. If desired, an indicator for the second temporary point 702 can be displayed.

Block 604 checks to determine if a command has been accepted to move the cursor 306 within a snap distance of one of the second set of candidate alignment lines. The process of making this determination is performed using the techniques described above. If the cursor has been moved within a snap distance of one of the second set of candidate alignment lines, logic is transferred to block 606, which displays 606 a second alignment line 710.

The first set of candidate alignment lines 304 and the second set of candidate alignment lines 704 will include lines that will intersect at particular points in the drawing space 300. In the example shown in FIG. 7, candidate alignment lines intersect at points 716A, 716B and 716C (collectively referred to hereinafter as 716). As the user moves the cursor 306 throughout the drawing space 300, the cursor will be placed in regions which are not within the snap distance of any of the first set of candidate alignment lines 304 or the second set of candidate alignment lines 704. In this situation, no alignment line is displayed. When the cursor 306 is moved to other regions of the drawing space 300, the cursor 306 will be within the snap distance of one of the first set of candidate alignment lines 304 or the second set of candidate alignment lines 704, but not both. In these regions (illustrated as A and B in FIG. 7), only one alignment line is displayed. The cursor 306 may also be moved to other regions in which it is within the snap distance of one of the first set of candidate alignment lines 304 and one of the second set of candidate alignment lines 704. In these regions (denoted as C in FIG. 7), an alignment line 310 from the first set of candidate alignment lines 304 and an alignment line 710 from the second set of candidate alignment lines 704 is presented. At this point, a glyph or other indicator 712 can be displayed to indicated the precision drawing point, and the user can select the precision drawing point as the intersection of the first alignment line 310 and the second alignment line 710. After selection, the glyphs 302 and 702 and alignment lines 710 and 310 can be removed from the drawing space 300.

Figure 8:
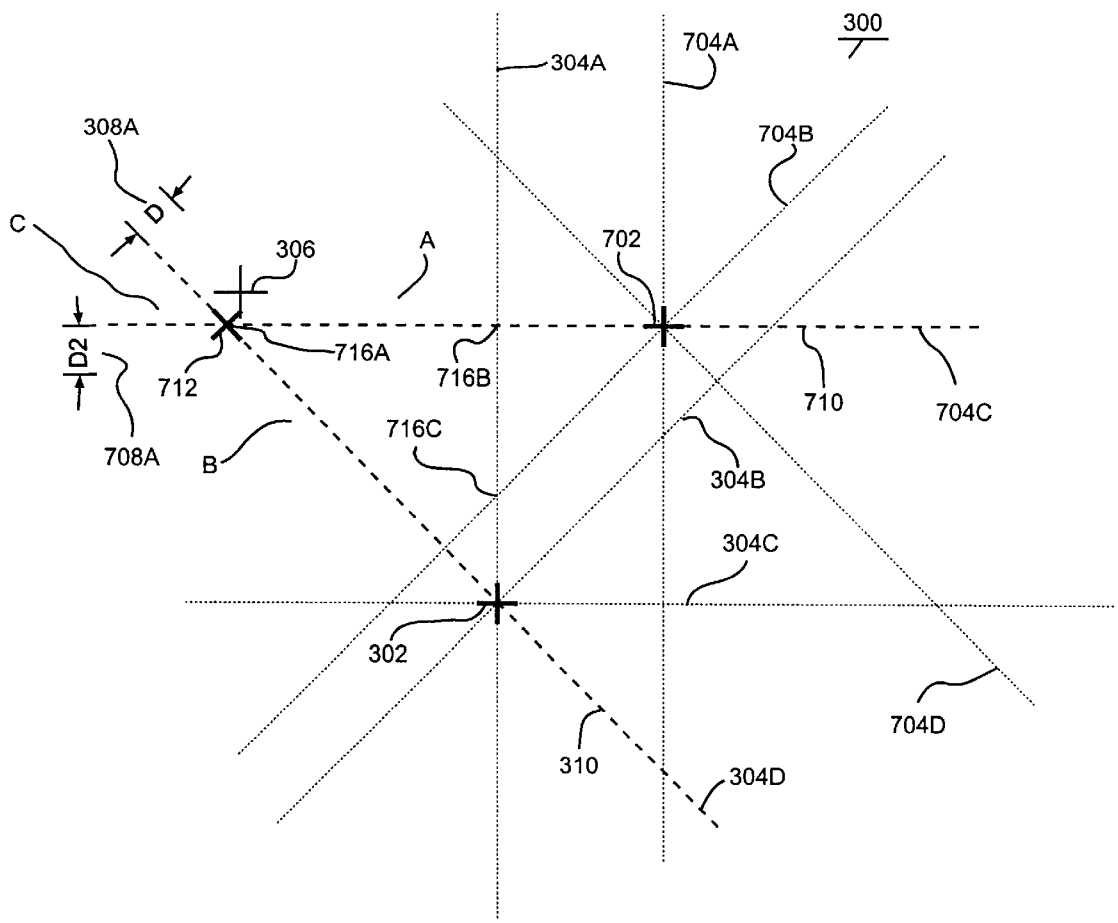
FIG. 8 is a diagram presenting an illustrative example of an alternative application of the process steps described in FIG. 6.

FIG. 8 shows an alternative embodiment of the present invention in which the snap distance to each line D 308A and D2 708A can vary with the distance from the temporary points. This implementation is useful in situations where the temporary points positioned at 302 and 702 are close together (for example, at a distance less than the snap distances D 308A and D2 708A), because it prevents the display of a multiplicity of alignment lines. If necessary, logic can be implemented to determine the separation of the temporary points, and the implementations described in FIG. 7 and FIG. 8 can be selected on this basis. The present invention can also be implemented by using an angular snap distance instead of a linear snap distance. In this implementation, the decision to snap to one of the candidate alignment lines 304 or 704 is made based upon the angle between the line described by the cursor and the temporary interesting point and the candidate alignment line 304. If the angle thus formed is less than a snap angle, the alignment line 310 is displayed in the drawing space 300. This implementation will also prevent the display of a multiplicity of alignment lines in cases where the temporary points are close together. If necessary, logic can be implemented to determine the separation of the temporary points, and a decision made as to whether the angular or linear distance snap techniques is used.

CONCLUSIONS

This concludes the description of the preferred embodiments of the present invention. In summary, the present invention describes a method, apparatus, and article of manufacture for defining a precision drawing point in a drawing space.

The method comprises the steps of accepting a command to specify a temporary interesting point anywhere in a drawing space on a display, and displaying an alignment line when a command is accepted to move a cursor to within a snap distance of one of a set of pre-settable alignment lines extending from the temporary interesting point.

In one embodiment of the present invention, an indicator is displayed to indicate the position of the user-selected temporary interesting points. Candidate positions for the precision point can be defined and annotated as the intersection of alignment lines from two user-defined temporary interesting points, or can be defined and annotated when the cursor is moved within a length snap distance from one of a set of pre-settable distances from the temporary into resting point and extending along the displayed alignment line. The article of manufacture comprises a program storage device tangibly embodying instructions for performing the method steps described above.

The apparatus comprises means for accepting a command specifying a temporary interesting point anywhere in the drawing space, and means for displaying an alignment line when a command is accepted to move the cursor to within a snap distance of one of a set of pre-settable lines extending from the temporary interesting point.

As described above, the present invention gives the user the flexibility to define temporary interesting points anywhere in a drawing space, and to use those temporary interesting points to assist in the definition of a precision drawing point. The temporary drawing points need not be associated with any existing objects or features in the drawing space, and can be used to align or extend objects as desired.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of defining a precision drawing point, comprising:

specifying a user-selected temporary point anywhere in a drawing space, wherein the temporary point is unassociated with any existing geometry in the drawing space;

defining a set of alignment lines that intersect at the user-selected temporary point in response to the specifying; and displaying an alignment line from the set of alignment lines when a cursor is moved to within a snap distance of the alignment line.

2. The method of claim 1, further comprising displaying an indicator for the temporary point.

3. The method of claim 1, wherein the snap distance is an angular snap distance.

4. The method of claim 1, wherein the snap distance is a linear snap distance.

5. The method of claim 1, further comprising selecting the drawing point along the alignment line.

6. The method of claim 5, wherein selecting the drawing point along the alignment line comprises:

annotating a position along the displayed alignment line when the cursor is moved to within a length snap distance of one of a set of pre-settable distances from the temporary point and extending along the displayed alignment line; and accepting the annotated position as the drawing point.

7. The method of claim 6, further comprising removing the alignment line and a temporary point indicator when the annotated position is selected as the drawing point.

8. The method of claim 1, further comprising:

specifying a second temporary point anywhere in the drawing space presented on the display; and displaying a second alignment line when the cursor is moved within a snap distance of one of a second set of alignment lines extending from the second temporary point.

9. The method of claim 8, further comprising selecting the drawing point as the intersection of the alignment line and the second alignment line.

10. An apparatus for defining a precision drawing point, comprising:

means for specifying a user-selected temporary point anywhere in a drawing space, wherein the temporary point is unassociated with any existing geometry in the driving space;

means for defining, in response to the specifying, a set of alignment lines that intersect at the user-selected temporary point; and means for displaying an alignment line from the set of alignment lines when a cursor is moved to within a snap distance of the alignment line.

11. The apparatus of claim 10, further comprising means for displaying an indicator for the temporary point.

12. The apparatus of claim 10, wherein the snap distance is an angular snap distance.

13. The apparatus of claim 10, wherein the snap distance is a linear snap distance.

14. The apparatus of claim 10, further comprising means for selecting the drawing point along the alignment line.

15. The apparatus of claim 14, wherein the means for selecting the drawing point along the alignment line comprises:

means for annotating a position along the displayed alignment line when the cursor is moved to within a length snap distance of one of a set of pre-settable distances from the temporary point and extending along the displayed alignment line; and means for accepting the annotated position as the drawing point.

16. The apparatus of claim 15, further comprising means for removing the alignment line and a temporary point indicator when the annotated position is selected as the drawing point.

17. The apparatus of claim 10, further comprising:

means for specifying a second temporary point anywhere in the drawing space presented on the display; and means for displaying a second alignment line when the cursor is moved within a snap distance of one of a second set of alignment lines extending from the second temporary point.

18. The apparatus of claim 17, further comprising means for selecting the drawing point as the intersection of the alignment line and the second alignment line.

19. A program storage device, readable by a computer, tangibly embodying at least one program of instructions executable by the computer to perform a method of defining a precision drawing point, the method comprising:

specifying a user-selected temporary point anywhere in a drawing space, wherein the temporary point is unassociated with any existing geometry in the drawing space;

defining a set of alignment lines that intersect at the user-selected temporary point in response to the specifying; and displaying an alignment line from the set of alignment lines when a cursor is moved to within a snap distance of the alignment line.

20. The program storage device of claim 19, further comprising displaying an indicator for the temporary point.

21. The program storage device of claim 19, wherein the snap distance is an angular snap distance.

22. The program storage device of claim 19, wherein the snap distance is a linear snap distance.

23. The program storage device of claim 19, wherein the method further comprises selecting the drawing point along the alignment line.

24. The program storage device of claim 23, wherein selecting the drawing point along the alignment line comprises annotating a position along the displayed alignment line when the cursor is moved to within a length snap distance of one of a set of pre-settable distances from the temporary point and extending along the displayed alignment line; and accepting the annotated position as the drawing point.

25. The program storage device of claim 24, wherein the method further comprises removing the alignment line and the temporary point indicator when the annotated position is selected as the drawing point.

26. The program storage device of claim 19, wherein the method further comprises:

specifying a second temporary point anywhere in the drawing space presented on the display; and displaying a second alignment line when the cursor is moved within a snap distance of one of a second set of alignment lines extending from the second temporary point.

27. The program storage device of claim 26, wherein the method further comprises selecting the drawing point as the intersection of the alignment line and the second alignment line.

* * * * *